(12) United States Patent
Sulzberger et al.

(10) Patent No.: US 7,738,789 B2
(45) Date of Patent: Jun. 15, 2010

(54) RADIO BASE STATION WITH MULTIPLE RADIO FREQUENCY HEADS

(75) Inventors: Uwe Sulzberger, Stuttgart (DE); Keld Lange, Ötisheim (DE)

(73) Assignee: Evolium S.A.S., Paris (FR)

( * ) Notice: Subject to any disclaimer, the term of this patent is extended or adjusted under 35 U.S.C. 154(b) by 1337 days.

(21) Appl. No.: 11/011,216

(22) Filed: Dec. 15, 2004

(65) Prior Publication Data
US 2005/0152695 A1 Jul. 14, 2005

(30) Foreign Application Priority Data
Jan. 8, 2004 (EP) .................................. 04290047

(51) Int. Cl.
*H04B 10/20* (2006.01)
*H04J 14/00* (2006.01)

(52) U.S. Cl. ............................................ 398/59; 398/4

(58) Field of Classification Search ......... 398/115–116, 398/3–4, 58–59
See application file for complete search history.

(56) References Cited

U.S. PATENT DOCUMENTS 5,809,395 A 9/1998 Hamilton-Piercy et al.
6,477,154 B1* 11/2002 Cheong et al. ............... 370/328
6,687,236 B1* 2/2004 Goldstein ..................... 370/289
6,744,764 B1* 6/2004 Bigdeliazari et al. ........ 370/394
2002/0075906 A1* 6/2002 Cole et al. ................... 370/535
2003/0188233 A1* 10/2003 Lubbers et al. .............. 714/100

FOREIGN PATENT DOCUMENTS

EP        1 250 018 A1    10/2002
EP        1 343 335 A1    9/2003
WO       WO 98/25365 A2   6/1998

OTHER PUBLICATIONS

CPRI Specification V1.0 "Common Public Radio Interface (CPRI); Interface Specification" Sep. 30, 2003; pp. 1-54.

* cited by examiner

*Primary Examiner*—Quan-Zhen Wang
(74) *Attorney, Agent, or Firm*—Sughrue Mion, PLLC

(57) ABSTRACT

A radio base station has a baseband unit (BB) and multiple RF heads (RH1, RH2), which are interconnected by means of a bi-directional two-fiber optical ring (R). Each RF head (RH1, RH2) has a delay counter (31) for determining a propagation delay (tL) on the ring (R) and a variable delay circuit (16, 26) for compensating a difference between the propagation delay on the ring and a predefined target delay (tRR). The delay counter counts (31) the delay between a test signal sent on the first fiber (F1) of the ring to the baseband unit and a received test signal looped back by the baseband unit on the second fiber (F2) of the ring.

12 Claims, 2 Drawing Sheets

US 7,738,789 B2

RADIO BASE STATION WITH MULTIPLE RADIO FREQUENCY HEADS

FIELD OF THE INVENTION

The present invention relates to the field of telecommunications and more particularly to a radio base station with multiple radio frequency heads for use in a cellular radio network.

The invention is based on a priority application, EP 04290047.2, which is hereby incorporated by reference.

BACKGROUND OF THE INVENTION

In a cellular radio network, a certain service area is covered by several radio base stations, which are connected to a mobile switching center to serve calls to and from mobile users within the service area. In the new UMTS standard, such a radio base station is also termed a "node B". A radio base station contains a baseband unit and at least one antenna unit. In order to increase radio coverage and capacity, modern base stations use several sector antennas.

In order to increase flexibility of the base stations, it is desirable to allow the antennas to be located remote from the baseband unit. This has led to the development of active antenna systems which are also termed radio frequency heads (RF heads). Typically, one RF head contains one sector antenna, but systems are also known which have RF heads with more than only one sector antennas. RF heads must, however, be located quite close (distance up to 30 m) to the baseband unit to limit the losses occurring on the RF cables connecting the two. Moreover, the use of longer interconnections would lead to problems with different propagation delays between baseband unit and the several RF heads.

The recently published Common Public Radio Interface (CPRI) Specification V1.0, 30.09.2003, describes an internal interface of radio base stations between the baseband unit, which is termed Radio Equipment Control (REC), and the RF head, which is termed the Radio Equipment (RE). The document defines an optical interface for base stations with remote radio equipment and a delay calibration procedure, which estimates the path delay between REC and RE by measuring the round trip delay and divide it by 2. The specification assumes, however, bi-directional point-to-point connections between the REC and each RE, which may be cumbersome and expensive to implement for a base station with multiple RF heads.

U.S. Pat. No. 5,809,395 describes a radio base station where the antennas are associated with active antenna systems and the active antenna systems are connected to the base stations utilizing broadband transmission by means of a fixed bi-directional signal distribution network.

It is an object of the present invention to provide a radio base station with multiple RF heads which are connected to a baseband unit in a simple and efficient way.

SUMMARY OF THE INVENTION

These and other objects that appear below are achieved by a radio base station having a baseband unit and multiple RF heads, which are interconnected by means of a bi-directional two-fiber optical ring. Each RF head has a delay counter for determining a propagation delay on the ring and a variable delay circuit for compensating a difference between the propagation delay on the ring and a predefined target delay. The delay counter counts the delay between a test signal sent on the first fiber of the ring to the baseband unit and a received test signal looped back by the baseband unit on the second fiber of the ring.

The introduction of a bi-directional fiber ring enables the use of distributed radio equipment, supports macro and pico-cell applications and leads to simpler and cleaner installation. Moreover, the introduction of a two-fiber ring provides improved safety against failures as signals can be send in either direction along the ring.

BRIEF DESCRIPTION OF THE DRAWINGS

A preferred embodiment of the present invention will now be described with reference to the accompanying drawings in which.

DETAILED DESCRIPTION OF THE INVENTION

Figure 1:
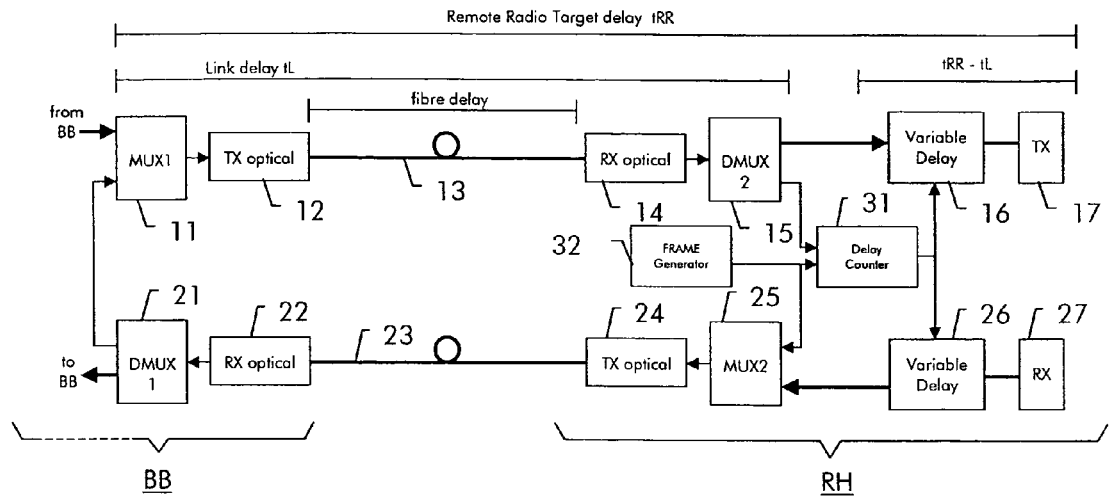
FIG. 1 shows the delay measurement on the ring.

A base station with the optical interfaces of a baseband unit BB and one remote radio frequency (RF) ead RH hown by way of example in FIG. 1. The baseband unit BB as such is not shown in the figure. In transmit direction, the baseband signal from the baseband unit is fed to a multiplexer 11, which is connected to an optical transmitter 12. Transmitter 12 is connected via an optical fiber 13 to an optical receiver 14 of RF head RH. Optical receiver 14 leads to a demultiplexer 15. The signal extracted by demultiplexer 15 is connected via a variable delay circuit 16 to a radio transmitter 17. In receive direction, a radio receiver 27 in the RF head is connected via a variable delay circuit 26 to a multiplexer 25, which leads to an optical transmitter 24 of the RF head. Transmitter 24 is connected via an optical fiber 23 to an optical receiver 22 of the baseband unit. A demultiplexer extracts baseband signals received from the RF heads and forwards them to the baseband unit BB (not shown).

When more than one remote RF heads are to be connected to the baseband unit via optical links, it is a requirement that the total remote radio delay tRR be the same for all remote RF heads. This is achieved by the use of the variable delay circuits 16 and 26 and a delay measurement in the RF heads using a delay counter 31. The principle of delay measurement is as follows: A frame generator 32 generates a test signal, which is transmitted via multiplexer 25 and optical transmitter 24 over the optical fiber link 23 to the receiver 22 of the baseband unit BB. Upon generation of the test signal, frame generator 32 starts the delay counter 31. In the baseband unit, demultiplexer 21 recognizes the test signal and loops the test signal back via multiplexer 11 and optical transmitter 12 over fiber link 13 to the RF head RH. Demultiplexer 15 in the RF head recognizes the test signal and stops the delay counter 31. Under the assumption that uplink and downlink have the same delay, the delay value thus obtained represents twice the link delay tL. The delay value is therefore used to adjust the total remote radio delay tRR to its nominal value. Accordingly, the variable delay circuits 16 and 26 are set to a value tRR-tL.

Figure 2:
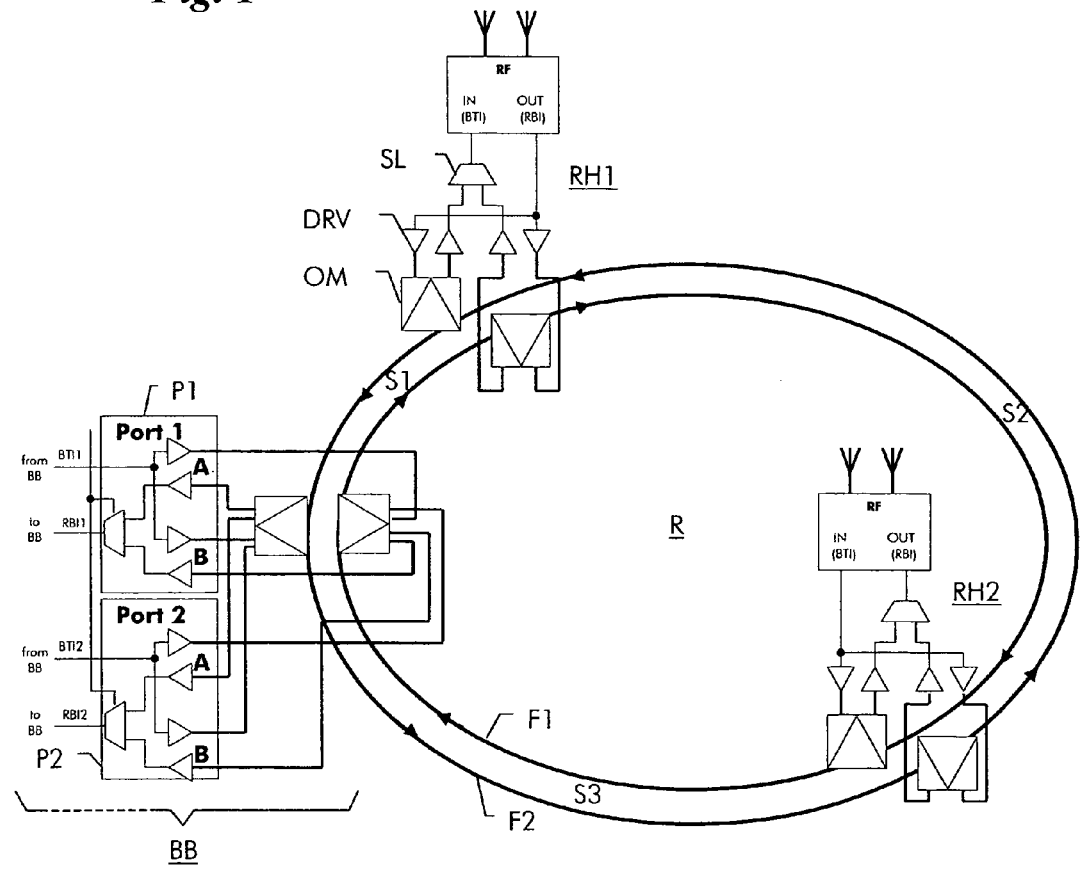
FIG. 2 shows a bi-directional fiber ring interconnecting a baseband unit and two RF heads of the base station according to the invention.

FIG. 2 shows a base station with remote RF heads according to the invention. The baseband unit BB is connected to a two-fiber optical ring, which consists of fibers F1 and F2. Two RF heads RH1 and RH2 are connected to the ring. The total length of the ring can be typically about 20 km. According to the invention, each RF head is connected to both fibers of the ring. Both fibers have similar delay characteristics and are operated in opposite directions. For redundancy purpose, the baseband unit has two redundant ports P1 and P2. Similar data signals are transmitted on both rings. A selector circuit SL selects from the two rings the data that are destined for the corresponding RF head. Optical modules OM with optical receivers and transmitters connect the RF heads and baseband units to the ring. Electrical line drivers DRV connect the optical module with RF equipment or with the baseband unit, respectively. The RF heads have diversity receivers and two antennas for antenna diversity, respectively.

In order to understand the concept of the delay compensation, the ring can be logically divided into three section, a first section S1 between BB and RH1, a second section S2 between RH1 and RH2 and a third section S3 between RH2 and BB. Each sector encounters a characteristic delay t1, t2, and t3, respectively. The propagation delay of signals passing from baseband unit BB to RF head RH1 over the first ring F1 is t1 and over the second ring F2 the delay is t2+t3. Conversely, the propagation delay of signals passing from RF head RH1 to baseband unit BB over the first ring F1 is t2+t3 and over the second ring F2 is t1. Thus, when different ring fibers are selected in receive and transmit direction, the delay is the same in receive and transmit direction. As a consequence, the total remote radio delay tRR is preferably chosen to equal the round trip delay of the ring, as this is the maximum delay value that may occur in either direction.

The two-fiber ring can be divided into two logical loops between the baseband unit and each RF head, a shorter one and a longer one. The simple case to operate these two loops is a 1+1 protection, which means that both logical loops carry the same data signals. Then, the baseband unit as well as each RF head can decide which loop is the active one depending on their own local link status and thus on locally available information, only. In a preferred improvement of the invention, however, use is made of both ring directions at the same time and a signal degradation is allowed in the case of a failure on the ring. In one embodiment, for example, the signals from the first of the two antennas are transmitted over fiber F1 and the signals from the second antenna are transmitted over the other fiber F2. In another advantageous embodiment, the carrier frequencies are separated onto the ring directions, i.e., a first carrier is transmitted over the first fiber and a second carrier is transmitted over the other fiber. In the case of a failure somewhere in the ring, the capacity (i.e., the number of users) will decrease but the radio coverage of the full service area is still maintained.

The signals on the ring are multiplex signals consisting of packet data e.g. for Order and Maintenance (OAM) purposes and of data streams per carrier and antenna. Up to twelve carriers are supported in the embodiment but typically only between two and four carriers are needed per RH depending on the license of the operator. This allows to attach several RHs to the ring. The signal rate of the baseband signals on the ring is 5 MBit/s for each carrier. The baseband signals of the individual carriers can be multiplexed in time as well as in wavelength on the ring. The useful radio signal rate in UMTS is 3.84 MHz. The radio signals received by at the antenna and demodulated from its carrier frequency is treated as an analog signal in the RF head and sampled with twice the signal rate, i.e., with 7.68 MHz. Each sample is referred to as one "chip".

The resolution of the delay circuits is preferably higher than the chip rate. By interpolation of the signal, the signal rate is increased by, for example, a factor of 10, i.e., to 76.8 MHz. When antenna diversity is used as in the above embodiments, a delay resolution in this order is required anyway to balance the radio delay between the two antennas. Therefore, it is preferable to implement also the delay compensation of the propagation delay on the ring in the RF heads. It is, however, also possible to implement a delay compensation in the baseband unit. In this case, the delay compensation can be achieved by software rather than by hardware. In particular, each data symbol from the sampled data stream is expected in a predefined expectancy window in the baseband unit. This expectancy window is defined with a constant offset resulting from transmission and processing delay in the previous stages (RF head, fiber ring, and optical module). It would thus be possible to make this constant delay adjustable and adjust it according to the propagation delay on the ring. The resolution of such a software-implemented delay compensation is, however, lower as in the above case of analogue HF processing in the RF head.

Propagation delay compensation can thus be achieved with hardware means in the RF heads or with software means in the baseband unit. Hardware delay compensation in the baseband unit would also be possible but would require some more effort and limit scalability of the base station. It should be noted that a hybrid approach can also be implemented with a software compensation of lower accuracy in the baseband unit and a hardware compensation with higher accuracy in the RF heads.

Figure 3:
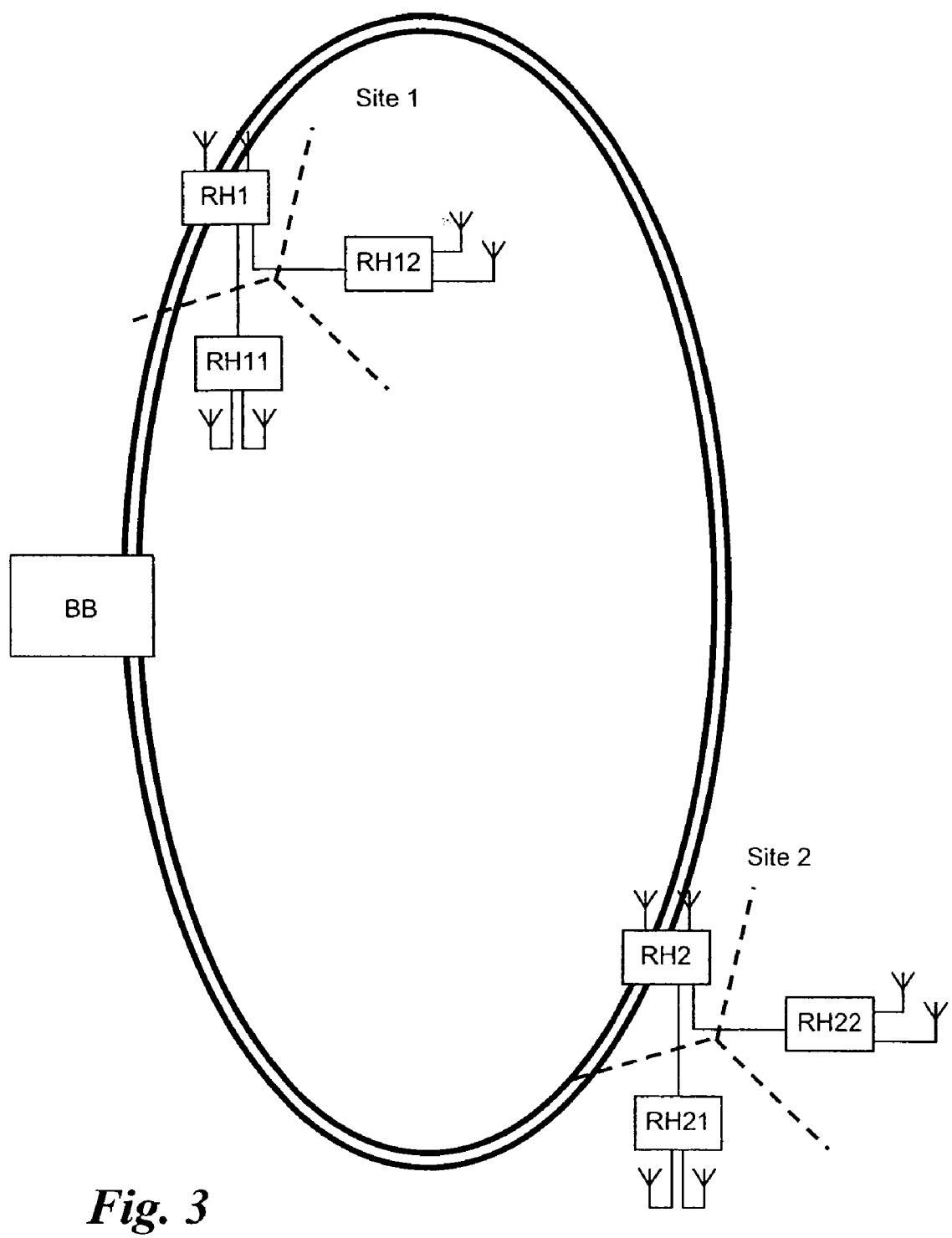
FIG. 3 shows an improvement of the ring architecture of FIG. 2.

In another improvement of the invention shown in FIG. 3, several RF heads are co-located at the same site. RF heads RH1, RH11, and RH12 are located at a first site and RF heads RH2, RH21, and RH22 are located at a second site. As indicated by broken lines, the RF heads have sector antennas, respectively, and three RF heads at one site are arranged to serve adjacent sectors of 120 degree, each, so that full 360 degree coverage is achieved. In this configuration, it is preferable that only one RF head per site is connected to the ring and distributes signals to the other two RF heads. In FIG. 3, RH1 from site 1 is connected directly to the ring while RH11 and RH12 are connected to RH1. Equally, at site 2 RH2 is connected to the ring while RH21 and RH22 are connected to RH2. Therefore, delay compensation is required only in RH1 and RH2.

The base station according to the invention provides several benefits. The downlink transmit timing at the antenna is the same for all sites. The only value that has to be configured at the remote RF heads is the target value for the delay compensation. Thus, optical modules do not have to support a control function by a central management system (OAM). Even this parameter can be determined locally by simply measuring the round trip delay of the ring. In addition, the management system does not need to be involved in redundancy switch-over of the ring directions.

An adverse effect of the invention is that the power control loop delay has to be increased by twice the round trip delay, which corresponds to a delay of about 150 µs for an average ring of 15 km length. Thus an increase of the average power control loop delay by one transmission slot, i.e., by 660 µs, ensures sufficient margin for the power control function.

What is claimed is:

1. A radio base station comprising:
   a baseband unit and at least two radio frequency heads which are interconnected by a bi-directional two-fiber optical ring; and
   means for determining a propagation delay on the ring and a variable delay means for compensating a difference between the propagation delay and a predefined target delay,
   wherein each radio frequency head comprises:

a delay counter for determining a propagation delay on the ring; and a variable delay circuit for compensating a difference between the propagation delay and a predefined target delay.

2. A radio base station according to claim 1, wherein the baseband unit is configured to loop a test signal received on a first fiber of the ring in reverse direction back to a second fiber of the ring; and wherein the delay counter is configured to count the delay between a test signal sent on the first fiber of the ring to the baseband unit and a received test signal looped back by the baseband unit on the second fiber of the ring.

3. A radio base station according to claim 1, wherein the delay means comprise a software module implemented in the baseband unit is configured and programmed to adjust an expectancy window for data symbols in received radio signals in accordance with a value determined for the propagation delay on the ring and wherein the radio frequency heads are configured to loop a test signal received on a first fiber of the ring in reverse direction back to a second fiber of the ring.

4. A radio base station according to claim 1 configured to transmit a first baseband signal corresponding to a first carrier frequency along the first fiber of the bi-directional two-fiber optical ring and to transmit a second baseband signal corresponding to a second carrier frequency along the second fiber of the bi-directional two-fiber optical ring.

5. A radio base station according to claim 1, wherein each radio frequency head comprises two antennas for antenna diversity and wherein the base station is configured to transmit a first signal received at the first antenna along the first fiber of the bi-directional two-fiber optical ring and to transmit a second signal received at the second antenna along the second fiber of the bi-directional two-fiber optical ring.

6. A radio base station according to claim 1, wherein further radio frequency heads are connected to at least one of the at least two radio frequency heads connected to the ring.

7. A radio base station according to claim 1, wherein the predefined target delay equals the round trip delay of the ring.

8. A radio base station according to claim 1, wherein the baseband unit is connected to both fibers of the ring via two redundant ports, respectively.

9. The radio base station of claim 1, wherein said propagation delay on the ring is determined between the at least two radio frequency heads, and between the baseband unit and the at least two radio frequency heads.

10. A radio base station comprising a baseband unit and at least two radio frequency heads which are interconnected by a bi-directional two-fiber optical ring, said radio frequency head comprising a delay counter for determining a propagation delay on the ring and a variable delay circuit for compensating a difference in the propagation delay and a predefined target delay; wherein the delay counter is configured to count the delay between a test signal sent on the first fiber of the ring to the baseband unit and a received test signal looped back by the baseband unit on the second fiber of the ring.

11. A radio base station comprising a baseband unit and at least two radio frequency heads, which are interconnected by a bi-directional two-fiber ring, said baseband unit being configured to loop a test signal received on a first fiber of the ring in reverse direction back to a second fiber of the ring.

12. A method of compensating a delay difference on a bi-directional two-fiber ring interconnecting a baseband unit and at least two radio frequency heads of a radio base station, said method comprising the steps of sending, by the at least two radio frequency heads, a test signal on a first fiber of the ring;

looping, by said baseband unit, said test signal back in reverse direction to a second fiber of the ring;

determining, by the at least two radio frequency heads, the delay between the test signal sent on the first fiber of the ring and the received test signal looped back by the baseband unit on the second fiber of the ring; and compensating, by the at least two radio frequency heads, a difference in the propagation delay and a predefined target delay.

\* \* \* \* \*